United States Patent [19]

Schlachter

[11] Patent Number: 6,077,593
[45] Date of Patent: Jun. 20, 2000

[54] DURABLE EDGE CEILING BOARD

[75] Inventor: Bartholomew J. Schlachter, Lancaster, Pa.

[73] Assignee: Armstrong World Industries, Inc., Lancaster, Pa.

[21] Appl. No.: 09/062,297

[22] Filed: Apr. 17, 1998

[51] Int. Cl.[7] .................................................... B32B 23/02
[52] U.S. Cl. ...................... 428/192; 428/195; 428/206; 428/210; 428/217; 428/339; 428/340; 428/413; 428/480
[58] Field of Search ........................... 428/192, 194, 428/195, 206, 210, 217, 339, 340, 420, 413, 417, 480

[56] References Cited

U.S. PATENT DOCUMENTS

| | | | |
|---|---|---|---|
| 3,404,134 | 10/1968 | Rees | 260/78.5 |
| 3,940,528 | 2/1976 | Roberts | 428/161 |
| 4,010,134 | 3/1977 | Braunisch et al. | 260/29.6 |
| 4,351,912 | 9/1982 | Jasperson | 523/218 |
| 4,559,377 | 12/1985 | Gleason et al. | 524/44 |
| 5,714,200 | 2/1998 | Schlachter et al. | 427/209 |

OTHER PUBLICATIONS

Epoxy Resins Chemistry and Technology, $2^{nd}$ edition, 1988.

*Primary Examiner*—William Krynski
*Assistant Examiner*—B. Shewareged
*Attorney, Agent, or Firm*—Womble Carlyle Sandridge & Rice

[57] ABSTRACT

This invention provides a ceiling board having a durable edge portion. The durable edge portion is obtained by applying a latex composition to the edge portion. The latex composition includes a binder and filler particles of two particle size ranges. The first filler particles have a median diameter of about 0.5 micron to about 5 microns. The second filler particles have a median diameter of about 20 microns to about 300 microns. The ratio of first filler particles to second filler particles is about 2:1 to about 1:8 by weight. The binder is preferably an epoxy, a urethane, a polyester, an acrylic, a melamine, or a vinyl based polymer latex. The binder preferably has a Tg of at least 10° C., and the ratio of filler to binder is about 2:1 to about 12:1 by weight.

31 Claims, No Drawings

DURABLE EDGE CEILING BOARD

FIELD OF THE INVENTION

The invention relates to ceiling boards, including ceiling panels and ceiling tile. In one of its more specific aspects, this invention is directed to ceiling boards which are installed in ceiling grid and having exposed, i. e. tegular, edges which edges have increased durability.

BACKGROUND OF THE INVENTION

The use of ceiling boards, both panels and tiles, is well known. Such boards can be made of any suitable material. Those containing glass fibers and having a surface coating find wide usage. Frequently, such boards are supported on ceiling grid or gridwork. Often the boards so supported drop slightly below the gridwork. This is because the edge is in the form of a flange or other protrusion which is retained on the gridwork and the substantially vertical edge portion between the surface of the flange which rests on the grid and the major exposed surface of the ceiling panel or tile (know as the reveal) is exposed. Such an edge is known as a tegular edge.

In order to provide a finished appearance to such edges, it has been customary to apply an edge coating or paint. Such paint is sprayed into the corner of the flange formed by the flange surface which contacts the grid (know as the perch) and the reveal. Some of the paint overlaps the major exposed surface of the ceiling panel (or front face) and the distal end portion of the flange. However, because such paint has not been durable, the boards have been susceptible to edge damage, such as denting, gouging, and scratching, due to handling and installation in the ceiling grid. This causes unsightly appearing tegular edges.

The ceiling board edge coatings of this invention increase durability and deter such difficulties. Further, the edge coatings of this invention permit application of an edge coating which does not result in picture framing or drying problems. Picture framing is the change in gloss level around the edge of the major exposed surface of the ceiling board due to an overlap in the edge coating and the paint coating which is applied to the major exposed surface. If the edge coating requires additional drying time or higher temperatures, the ceiling boards may warp.

As stated previously, it is well known to paint the edges of ceiling boards to improve appearance. For example, see Gleason et al. U.S. Pat. No. 4,559,377. However, composition of Gleason et al. is not the same as the present invention and such patent does not address the issue of durability. Therefore, the need for more durable tegular ceiling board edges continues to exist.

Caldwell et al. U.S. patent application Ser. No. 5,386, filed Jan. 9, 1998, for High Light Reflectance and Durable Ceiling Board Coating, which patent application is commonly owned, describes a durable paint for ceiling boards. However, the composition of such paint is different than the present invention. Further, there is no teaching of improving the durability or strength of flanges on ceiling boards. The paint composition of Caldwell et al. is applied perpendicular to the front face and does not coat the ceiling board reveal.

Accordingly, it is an object of the present invention to provide a ceiling board with more durable edges.

It is a further object to provide such a ceiling board which does not adversely affect the appearance of the major exposed surface of the ceiling board.

A still further object is to provide such a ceiling board which does not require additional oven drying.

SUMMARY OF THE INVENTION

The present invention is a ceiling board having a durable edge portion. The durable edge portion is obtained by applying a latex composition to the edge portion. The latex composition includes a binder and filler particles of two particle size ranges. The first filler particles have a median diameter of about 0.5 micron to about 5 microns. The second filler particles have a median diameter of about 20 microns to about 300 microns. The ratio of first smaller filler particles to second larger filler particles is about 2:1 to about 1:8 by weight. The binder is preferably an epoxy, a urethane, a polyester, acrylic, melamine, or vinyl based polymer. The ratio of filler to binder is about 1:1 to about 12:1 by weight or a pigment volume concentration of about 25% to about 85%.

In the preferred embodiment of the present invention; the larger filler particles have a median diameter of about 45 microns to about 75 microns; the smaller filler particles are limestone, titanium dioxide, silica, clay, and mixtures thereof; the larger filler particles are limestone, dolomite, sand, and mixtures thereof; the ratio of smaller filler particles to larger filler particles is about 1:2 by weight; the ratio of filler particles to binder is preferably about 2:1 to about 10:1, more preferably about 5:1 to about 8:1, and most preferably about 7:1 by weight or a pigment volume concentration of about 75%; the binder has a Tg of at least 10° C., and the latex composition has a solids content of at least 80% by weight or at least 60% by volume. The perpendicular surfaces of the edge portions have the latex composition applied in sufficient quantity such that after drying the perpendicular surfaces have about 4 grams/linear foot to about 5 grams/linear foot of latex composition solids on them.

DETAILED DESCRIPTION OF THE INVENTION

The increased durability of the present invention results from the high binder to filler ratio of the latex composition which is applied to the edges of the ceiling boards and the higher quantity of solids applied to the edges of the ceiling boards. Higher solids content of the latex composition is obtained by using a bimodal filler particle size distribution.

Further, durability is achieved by the selection of filler composition and binder composition. The fillers may be calcium carbonate, including limestone, titanium dioxide, sand, barium sulfate, clay, mica, dolomite, silica, talc, perlite, polymers, gypsum, wollastonite, calcite, aluminum trihydrate, pigments, zinc oxide, or zinc sulfate. Preferably the smaller size filler is calcium carbonate, such as limestone, titanium dioxide, silica, clay, or mixtures thereof, and the larger filler is a calcium carbonate, such as limestone, dolomite, sand, or mixtures thereof.

The binder is selected from of epoxy, urethane, polyester, acrylic, melamine, or vinyl based polymer latexes. The polymer can include one or more of the following monomers: vinyl acetate, vinyl propionate, vinyl butyrate, ethylene, vinyl chloride, vinylidene chloride, vinyl fluoride, vinylidene fluoride, ethyl acrylate, methyl acrylate, propyl acrylate, butyl acrylate, ethyl methacrylate, methyl methacrylate, styrene, butadiene, urethane, epoxy, melamine, and an ester. The binder preferably has a Tg of at least 10° C., more preferably at least 16° C., and most preferably at least 20° C.

The smaller size filler particles have a median particle size of about 0.5 to about 5 microns; preferably about 1 micron to about 3 microns. Filler particles less than about 0.5 microns do not yield a composition with a sufficiently high solids content. Filler particles greater than about 5 microns produce a latex composition which is not stable. The filler particles greater than about 5 microns, precipitated out of the latex composition after 24 hours.

The larger size filler particles have a median particle size of about 20 to about 300 microns. Filler particles greater than about 300 microns are difficult to apply in commercial production. Filler particles less than about 20 microns give less scratch resistance and lower burnishing resistance. More preferably, the larger filler particles have a median particle size of about 40 to about 125 microns. Particles greater than about 125 microns yield a latex composition which is difficult to apply by spraying. Particles less than about 40 microns again give less scratch resistance and lower burnishing resistance. The most preferred median particle size range is from about 45 to about 75 microns which yields the best compromise between ease of application, scratch resistance and gloss retention.

The selection of filler material improves scratch resistance and yields a coating with a low gloss level. The preferred calcium carbonate is an inexpensive filler which is hard and improves scratch resistance. The ratio of smaller filler particles to larger filler particles is about 2:1 to about 8:1 by weight, preferably about 1:1 to about 1:4 by weight, and most preferably about 1:1.5 to about 1.3 by weight.

The durability is improved by increasing the amount of solids applied to the edge portion of the ceiling panel. By using a high solids content latex composition, a durable edge can be formed with a single application. To obtain a similar durability with typical ceiling paints, multiple coats would be required. Therefore, additional water would need to be driven off, increasing drying time and temperature. Excessive heat tends to warp the ceiling board.

To permit deposition of sufficient coating for the desired durability in a single coating application, the solids content of the composition should be in excess of 70% by weight or in excess of 50% by volume, preferably in excess of 75% by weight or in excess of 55% by volume, and most preferably in excess of 80% by weight or 60% by volume. These high solids contents are achieved by a bimodal filler particle size distribution. If only smaller size filler particles were used, the latex composition would be too viscous. If only the larger size filler particles were used, sufficient viscosity and stability would not be obtained. Since the smaller filler particles do increase the viscosity of the latex composition, additional thickeners, such as hydroxyethylcellulose, are not necessary. However, additional thickeners may be added if desired to increase viscosity.

The larger filler particles reduce gloss level and picture framing. Picture framing is the increased gloss level on the front face of the ceiling panel adjacent to the edge of the ceiling board due to increased paint levels at the edge resulting from the overlap of the front face paint and the edge paint. The larger filler particles reduce the gloss level of the edge paint, and therefore, the gloss level and change in gloss of the overlapped paint portion.

The higher solids content also reduces the amount of latex composition which is applied to the edge portion of the ceiling board, and therefore, the amount of paint which is overlapped by the front face paint and the edge paint. Since there is less water, there is less puddling in the overlap, and therefore, less picture framing around the edges of the front face. Puddling is also reduced by the addition of wetting agent.

The higher binder level improves toughness which yields better durability. Typical ceiling tile paints have a filler to binder ratio of 40:1 to 15:1 by weight. The filler to binder ratio of about 1:1 to about 12:1 by weight or pigment volume concentration of about 25% to about 85% of the present invention yields a stronger, more durable edge coating. The preferred filler to binder ratio is about 5:1 to about 10:1 by weight and the preferred pigment volume concentration is about 60% to about 80%. The most preferred filler to binder ratio is about 7:1 by weight and the most preferred pigment volume concentration is about 75%. Of course, increasing the binder level or pigment volume concentration increases the cost of the latex composition. The preferred binder is an acrylic latex because the acrylic latexes have relative low cost, relative high strength, relative fast drying, a wide range of properties and appropriate Tg.

The durability of the edge portion also depends upon the amount of latex composition applied to the edge portion. To obtain the desired durability, the latex composition should be applied to the perpendicular surface of the edge portion such that after drying the perpendicular surface has about 2 grams/linear foot to about 10 grams/linear foot of latex composition solids, preferably about 3 grams/linear foot to about 7 grams/linear foot, and more preferably about 4 grams/linear foot to about 5 grams/linear foot.

EXAMPLE 1

A latex composition was prepared by mixing the following components, based on the total weight of the final mixture. The dry components were added to the wet components and mixed until uniformly distributed.

| Material | % Solids by wt | % by wt. |
|---|---|---|
| Water | 0 | 2.00 |
| Biocide | 21 | 0.08 |
| Titanium dioxide | 100 | 1.11 |
| Calcium carbonate (1.3μ) | 50 | 26.43 |
| Dispersant | 25 | 0.08 |
| Dolomite (125μ) | 100 | 39.29 |
| Acrylic resin (Tg 47° C.) | 50 | 30.29 |

EXAMPLE 2

A latex composition was prepared in the same manner as Example 1 except 30.29 weight percent of a vinyl acetate/acrylic copolymer resin having a Tg of 12° C. and solids content of 55% by weight was substituted for the acrylic resin.

The compositions of Examples 1 and 2 were applied to a flange cut into a mineral fiber ceiling board and tested for flange break and scratch resistance.

FLANGE BREAK (THUMB) TEST

A sample of ceiling tile three inches wide was clamped adjacent the flange and a force measured in pounds was applied to the flange perpendicular to the major surfaces of the ceiling tile surface. The force was applied through a ⅞ inch diameter washer which was oriented with the flat of the washer parallel to the major surfaces of the sample and the perch, and the distal edge of the washer was adjacent the flange reveal (vertical surface of the flange). The test results was the force in pounds required to break the flange.

SCRATCH RESISTANCE TEST

The test consists of "raking" various thicknesses of "feeler" gauge (spring steel) stock across the face or edge of a ceiling tile or panel. The measure is the highest "feeler" gauge thickness (in thousandths of an inch) that does not damage the test material. The metal tongues or fingers are securely arranged evenly in a row and each has a protruding length of approximately 1.875 inches. The thickness of the tongues increase from one end of the row to the other end. The tongue thicknesses are 10, 12, 14, 16, 18, 20, 22, and 25 mils. The sample is placed in a holder below the set of tongues with the sample flange lower than the cutout forming the flange. The tongues are allowed to overlap across the top edge of the sample with the bottom of the tongue a distance of approximately 7/32 inches below the surface of the sample in the cutout forming the flange. The tongues are then drawn across the sample at a speed of 20 inches per minute. The thicker tongues will cause a scratch more easily and damage the edge more easily than the thinner tongues.

| Coating | Flange Break (Thumb) (lbs) | Scratch Resistance (mils) |
| --- | --- | --- |
| None | 9.1 | 12 |
| Example 1 | 12.4 | 22 |
| Example 2 | 11.0 | 22 |

EXAMPLE 3

A latex composition was prepared in the same manner as Example 1 except using the following components, based on the total weight of the final mixture.

| Material | % Solids | % by wt. |
| --- | --- | --- |
| Water | 0 | 1.0 |
| Titanium dioxide (0.2μ) | 100 | 5.3 |
| Calcium carbonate (1.3μ) | 75 | 28.7 |
| Wetting Agent | 100 | 0.1 |
| Dolomite (75μ) | 100 | 43.3 |
| Acrylic resin (Tg 47° C.) | 50 | 20.1 |
| Dispersant | 40 | 0.4 |
| Defoamer | 0 | 0.1 |
| Coalescing Agent | 0 | 1.0 |

The mixture was applied to ceiling board samples in the same manner as Examples 1 and 2 at two different application rates, 4.0 gms/linear ft and 4.75 gms/linear ft. Three inch samples were prepared and tested for flange break up and flange break down with the following results.

FLANGE BREAK TEST

A sample of ceiling tile three inches wide was clamped adjacent the flange and a force measured in pounds was applied to the end of the flange perpendicular to the major surfaces of the ceiling tile and perch with a three inch wide ram having a stepped end. The indented portion of the stepped end of the ram was 1/8 inch deep and the 1/8 inch deep surface contacted the upper surface of the sample flange (perch). The test result was the force in pounds required to break the flange. There were two tests run, Flange Break Down in which the sample was clamped with the flange down, i.e. the flange was lower than the cutout forming the flange (the force was applied to the perch). In the Flange Break Up test the sample was clamped with the flange up, i.e. the flange was above the cutout forming the flange and the force was applied to the back face of the ceiling panel (the surface opposite the front face).

| Appln Weight (gms/lin ft) | Flange Break Up (lbs) | Flange Break Down (lbs) |
| --- | --- | --- |
| Control | 20.8 | 18.3 |
| 4.0 | 25.9 | 21.1 |
| 4.75 | 32.8 | 26.2 |

The control was a commercial product having typical edge coating paint applied. The samples were also tested for scratch resistance with the following results.

SCRATCH RESISTANCE TEST

The test was the same as previously described except an additional test was run by drawing the tongues across the sample toward the flange.

| Appln Weight (gms/lin ft) | Scratch Resistance (Edge to Broad) (mils) | Scratch Resistance (Broad to Edge) (mils) |
| --- | --- | --- |
| Control | 18.0 | 10.0 |
| 4.0 | 19.3 | 12.0 |
| 4.75 | 21.3 | 14.0 |

As can be seen from Example 3, the edge portions which have a flange break up test of at least 23 lbs, a flange break down test of at least 20 lbs, a scratch resistance (edge to broad) tests of at least 19 mils, and a scratch resistance (broad to edge) test of at least 11 mils has improved durability. Preferably the a flange break up test is at least 25 lbs, the flange break down test is at least 21 lbs, the scratch resistance (edge to broad) test is at least 19 mils, and the scratch resistance (broad to edge) test is at least 12 mils.

EXAMPLE 4

A latex composition can be prepared in the same manner as Example 1 except using the following components, based on the total weight of the final mixture.

| Material | % Solids | % by wt. |
| --- | --- | --- |
| Water | 0 | 5.5 |
| Titanium dioxide | 100 | 4.8 |
| Calcium carbonate (1.3μ) | 75 | 25.9 |
| Wetting Agent | 100 | 0.1 |
| Dolomite (75μ) | 100 | 39.1 |
| Epoxy resin (Tg 40° 9C.) | 43 | 23.2 |
| Dispersant | 40 | 0.4 |
| Coalescing Agent | 0 | 1.0 |

EXAMPLE 5

A latex composition was prepared in the same manner as Example 1 except using the following components, based on the total weight of the final mixture.

| Material | % Solids | % by wt. |
| --- | --- | --- |
| Water | 0 | 0.8 |
| Titanium dioxide (0.2μ) | 100 | 5.3 |
| Calcium carbonate (1.3μ) | 75 | 28.8 |

-continued

| Material | % Solids | % by wt. |
|---|---|---|
| Wetting Agent | 100 | 0.1 |
| Dolomite (45μ) | 100 | 43.4 |
| Acrylic resin (Tg 47° C.) | 47 | 20.2 |
| Dispersant | 40 | 0.4 |
| Coalescing Agent | 0 | 1.0 |

EXAMPLE 6

A latex composition was prepared in the same manner as Example 1 except using the following components, based on the total weight of the final mixture.

| Material | % Solids | % by wt. |
|---|---|---|
| Water | 0 | 0.8 |
| Titanium dioxide (0.2μ) | 100 | 5.3 |
| Calcium carbonate (1.3μ) | 75 | 28.8 |
| Wetting Agent | 100 | 0.1 |
| Dolomite (75μ) | 100 | 43.4 |
| Styrene/Acrylic resin (Tg 27° C.) | 50 | 20.2 |
| Dispersant | 40 | 0.4 |
| Coalescing Agent | 0 | 1.0 |

The compositions of Examples 5 and 6 were applied to a flange cut into a mineral fiber ceiling board. The samples have improved durability similar to Example 3.

I claim:

1. A ceiling board having a durable peripheral portion, the ceiling board comprising a front face, a back face, and a plurality of side faces, the peripheral portion comprising the side faces and a portion of the front face adjacent the side faces, the peripheral portion having a latex composition applied thereto, a portion of the ceiling board surface other than the peripheral portion being substantially free of the latex composition, the latex composition comprising a binder and filler particles of two particle size ranges, the first filler particles having a median diameter of about 0.5 micron to about 5 microns, the second filler particles having a median diameter of about 20 microns to about 300 microns, the ratio of the first filler particles to second filler particles being about 2:1 to about 1:8 by weight, the binder being selected from the group consisting of epoxy, urethane, polyester, melamine, vinyl polymers, and acrylics, the ratio of the filler to binder solids being about 1:1 to about 12:1 by weight, and wherein the side faces have a surface which is substantially perpendicular to the front face, the latex composition being applied to the perpendicular surface such that after drying the perpendicular surface has about 2 grams/linear foot to about 10 grams/linear foot of latex composition solids applied to it.

2. The ceiling board of claim 1 wherein the first filler particles have a median diameter of about 1 micron to about 3 microns.

3. The ceiling board of claim 1 wherein the second filler particles have a median diameter of about 45 microns to about 75 microns.

4. The ceiling board of claim 1 wherein the first filler particles are selected from the group consisting of limestone, titanium dioxide, silica, clay, and mixtures thereof.

5. The ceiling board of claim 1 wherein the second filler particles are selected from the group consisting of limestone, dolomite, sand, and mixtures thereof.

6. The ceiling board of claim 1 wherein the first and second filler particles are calcium carbonate particles.

7. The ceiling board of claim 1 wherein the ratio of first filler particles to second filler particles is about 1:1.5 to about 1:3 by weight.

8. The ceiling board of claim 1 wherein the ratio of filler particles to binder solids is about 5:1 to about 8:1 by weight.

9. The ceiling board of claim 1 wherein the binder is an acrylic.

10. The ceiling board of claim 1 wherein the binder has a Tg of at least 10° C.

11. The ceiling board of claim 1 wherein the latex has a solids content of at least 50% by volume.

12. The ceiling board of claim 1 wherein the latex has a solids content of at least 70% by weight.

13. The ceiling board of claim 1 wherein the side faces have a surface which is substantially perpendicular to the front face, the latex composition being applied to the perpendicular surface such that after drying the perpendicular surface has about 2 grams/linear foot to about 10 grams/linear foot of latex composition solids applied to it.

14. A ceiling board having a durable peripheral portion, the ceiling board comprising a front face, a back face, and a plurality of side faces, the peripheral portion comprising the side faces and a portion of the front face adjacent the side faces, the peripheral portion having a latex composition applied thereto, a portion of the ceiling board surface other than the peripheral portion being substantial free of the latex composition, the latex composition comprising a binder and filler particles of two particle size ranges, the first filler particles having a median diameter of about 0.5 micron to about 5 microns, the second filler particles having a median diameter of about 20 microns to about 300 microns, the ratio of first filler particles to second filler particles being about 2:1 to about 1:8 by weight, the binder being selected from the group consisting of epoxy, urethane, polyester, melamine, vinyl polymers, and acrylics, and the filler volume concentration being about 25% to about 85%.

15. The ceiling board of claim 14 wherein the first filler particles are selected from the group consisting of limestone, titanium dioxide, silica, clay, and mixtures thereof.

16. The ceiling board of claim 14 wherein the second filler particles are selected from the group consisting of limestone, dolomite, sand, and mixtures thereof.

17. The ceiling board of claim 14 wherein the latex has a solids content of at least 50% by volume.

18. The ceiling board of claim 14 wherein the latex has a solids content of at least 70% by weight.

19. The ceiling board of claim 14 wherein the side faces have a surface which is substantially perpendicular to the front face, the latex composition being applied to the perpendicular surface such that after drying the perpendicular surface has about 2 grams/linear foot to about 10 grams/linear foot of latex composition solids applied to it.

20. A ceiling board having a durable peripheral portion, the ceiling board comprising a front face, a back face, and a plurality of side faces, the peripheral portion comprising the side faces and a portion of the front face adjacent the side faces, the peripheral portion having a latex composition applied thereto, a portion of the ceiling board surface other than the peripheral portion being substantial free of the latex composition, the latex composition comprising a binder and filler particles of two particle size ranges, the peripheral portion having sufficient durability whereby the flange break up test (as set forth in the specification) is at least 23 lbs, the flange break down test (as set forth in the specification) is at least 20 lbs, the scratch resistance (edge to broad) test (as set forth in the specification) is at least 19 mils, and the scratch resistance (broad to edge) test (as set forth in the specification) is at least 11 mils.

21. The ceiling board of claim 1 wherein the latex composition comprises binder and filler, the filler consisting essentially of particles of two particle size ranges, the first filler particles having a median diameter of about 0.5 micron to about 5 microns, the second filler particles having a median diameter of about 20 microns to about 300 microns, the ratio of first filler particles to second filler particles being about 2:1 to about 1:8 by weight.

22. The ceiling board of claim 1 wherein the latex composition is applied by spraying.

23. The ceiling board of claim 1 wherein the latex composition comprises filler particles having a diameter of no greater than about 300 microns.

24. A ceiling board having a durable peripheral portion, the ceiling board comprising a front face, a back face, and a plurality of side faces, the peripheral portion comprising the side faces and a portion of the front face adjacent the side faces, the peripheral portion having a latex composition applied thereto, a portion of the ceiling board surface other than the peripheral portion being substantially free of the latex composition, the latex composition comprising a binder and filler particles of two particle size ranges, the first filler particles having a median diameter of about 0.5 micron to about 5 microns, the second filler particles having a median diameter of about 20 microns to about 300 microns, the ratio of the first filler particles to second filler particles being about 2:1 to about 1:8 by weight, the binder being selected from the group consisting of epoxy, urethane, polyester, melamine, vinyl polymers, and acrylics, the ratio of the filler to binder solids being about 1:1 to about 12:1 by weight, and wherein the binder has a Tg of at least 10° C.

25. The ceiling board of claim 24 wherein the first filler particles have a median diameter of about 1 micron to about 3 microns.

26. The ceiling board of claim 24 wherein the second filler particles have a median diameter of about 45 microns to about 75 microns.

27. The ceiling board of claim 24 wherein the ratio of the first filler particles to second filler particles is about 1:1.5 to about 1:3 by weight.

28. The ceiling board of claim 24 wherein the ratio of the first filler particles to binder solids is about 5:1 to about 8:1 by weight.

29. The ceiling board of claim 24 wherein the latex has a solids content of at least 50% by volume.

30. The ceiling board of claim 24 wherein the latex has a solids content of at least 70% by weight.

31. The ceiling board of claim 24 wherein the edge portion has a surface which is substantially perpendicular to the front face, the latex composition being applied to the perpendicular surface such that after drying the perpendicular surface has about 2 grams/linear foot to about 10 grams/linear foot of latex composition solids applied to it.

* * * * *